March 28, 1961     D. C. MULLER     2,977,003
CONVEYOR

Filed March 15, 1954     2 Sheets-Sheet 1

INVENTOR
DONALD C. MULLER
BY

ATTORNEYS

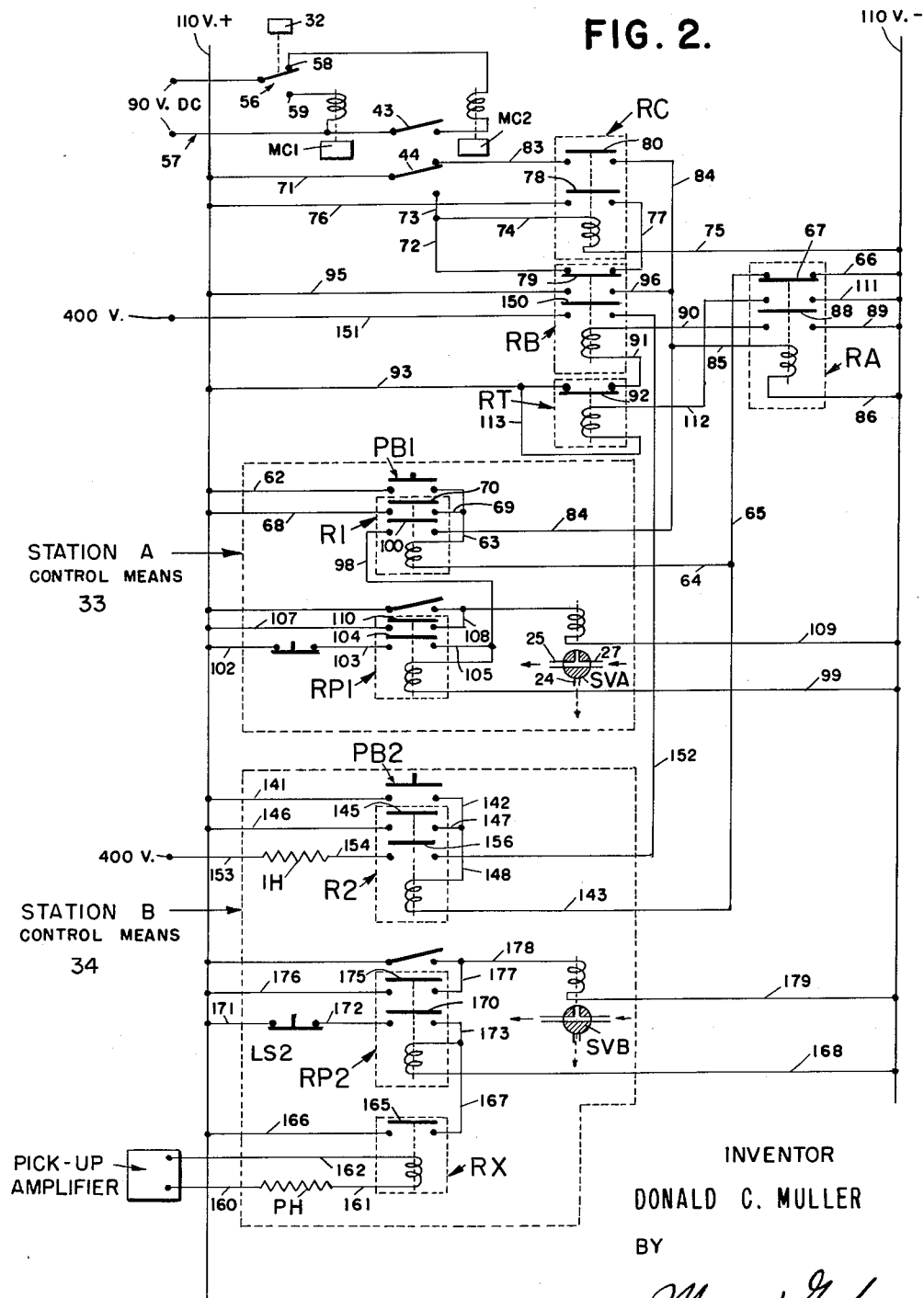

United States Patent Office 2,977,003
Patented Mar. 28, 1961

2,977,003

CONVEYOR

Donald C. Muller, Whittier, Calif., assignor to A. J. Bayer Company, Los Angeles, Calif., a corporation of California Filed Mar. 15, 1954, Ser. No. 416,157

12 Claims. (Cl. 214—11)

This invention has to do generally with material-handling apparatus and more particularly with such apparatus wherein articles are transferred or sorted by means of a main conveyor and a number of branch conveyors.

An object of the invention is to provide novel means for distributing or sorting articles wherein the articles initially travel on a main conveyor and are subsequently shunted off therefrom at selected stations where they may be deposited onto branch conveyors, whereby a single operator, from a position at the head of the main conveyor or at some other desired point, can preselect the destination of the individual articles and the apparatus will function automatically to remove the articles and deposit them respectively on the selected branch conveyors.

A particular object is to provide novel centering apparatus associated with a conveyor system embodying means for automatically determining when an object of unknown length (within given limits) traveling on the conveyor reaches a position such that the center of the object, defined as the point halfway between the foremost and rearmost edges of the object in the direction of its travel, is at a given point along the conveyor.

A further object is to provide novel apparatus in combination with centering means of the type indicated for performing a given operation at the instant an object traveling on the conveyor reaches a predetermined position on the conveyor. More specifically, it is an object to provide a novel apparatus for automatically removing an object from a conveyor or the like when the object reaches a preselected point in which a centering means is used for orienting the object on the conveyor and imparting a signal or actuating impulse to preselected means in combination therewith which then automatically functions at the proper time to cause removal of the object from the conveyor.

These and other objects will be apparent from the drawings and the following description.

Referring to the drawings:

Fig. 2 is a wiring diagram illustrating the electrical components of the apparatus;

Figure 1:
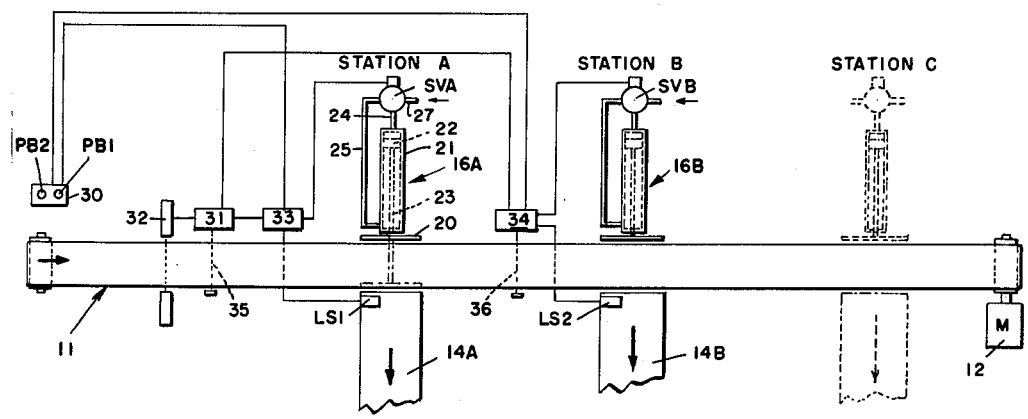
Fig. 1 is a schematic representation of apparatus for carrying out the invention.

More particularly describing the invention, referring to Fig. 1, 11 indicates a main conveyor which may be assumed to travel in the direction of the arrow thereon. The conveyor is driven by a motor 12. Spaced along the conveyor are two "stations," designated "Station A" and "Station B." At the first of these is a branch conveyor 14A and at the second a branch conveyor 14B, for receiving goods pushed off the main conveyor. At Station A is an article-transfer means or article-shunting means 16A, and at Station B an article-transfer or shunting means 16B. Each of these includes an article-engaging head 20 which is movable from the position in which it is shown to its broken-line position by compressed air or other suitable fluid operating within a cylinder 21 against piston 22 having a piston rod 23 carrying the head 20. The cylinder has suitable conduits 24 and 25 communicating with its opposite ends and these extend to a valve SVA (SVB at Station B) which is of the solenoid-operated type. The valve may be spring-biased to a position such that the head 20 is held retracted except when the solenoid is energized. A conduit 27 supplies the valve with air under pressure from any suitable source (not shown).

The transfer means at each station is electrically controlled and the control means is schematically shown in Fig. 1 as including an article-destination control panel 30, an article-centering means 31, electric eye means 32, Station A control means 33, and Station B control means 34. The elements 31 and 34 each include components which, in the form of the invention shown, are mechanically driven by the conveyor, and this has been indicated by the broken lines 35 and 36, respectively. The control panel may be located at any desired point, and the means 31, 33, and 34 may be grouped together at one location.

For the sake of simplicity, only two stations are shown and described. However, in practice, ordinarily several would be employed and, indicative of this, one additional station, Station C, is shown in broken lines in Fig. 1. Generally, in the operation of the apparatus, articles are placed on the conveyor at the left end thereof. The operator at the control panel 30 decides where an article is to go and pushes the appropriate switch button on the panel. This action sets up certain circuits in the selected station control means. As an article moves along the conveyor it cuts the electrical eye beam which sets in motion the article-centering means 31. The latter functions to determine when the article reaches a position on the conveyor such that the center of the article is at or opposite a predetermined point, termed a centering point, which is a predetermined distance beyond the electrical eye beam. In the apparatus shown, this point is at Station A substantially in front of or directly opposite the transfer means 16A, for a reason which will later become apparent. When an article reaches this position the centering means actuates the station control means previously selected. In the case of Station A, the transfer means 16A operates almost instantly. In the case of Station B (or other stations), there is a time delay corresponding to the time it takes the article to travel from the centering point to Station B before transfer means 16B operates. As will later appear, where Station B has been selected by the operator, when the centering means locates the article at the centering point, the control means for Station B is actuated. The latter includes a magnetic tape recorder unit having a tape driven at a definite known speed with relation to the conveyor belt, and having a length between the signal impressing means and a signal pickup means such that the time it takes for the tape to travel from the signal impressing means to the signal pickup means is equal to the time it takes for an object on the conveyor to travel from the centering point to Station B. Thus, when the article reaches the centering point, if Station B control means has been previously selected, the centering means actuates the said control means which impresses a signal on the traveling tape. When the portion of the tape bearing the signal reaches the pickup head, the latter functions to close an appropriate circuit to actuate the transfer means 16B.

Figure 3:
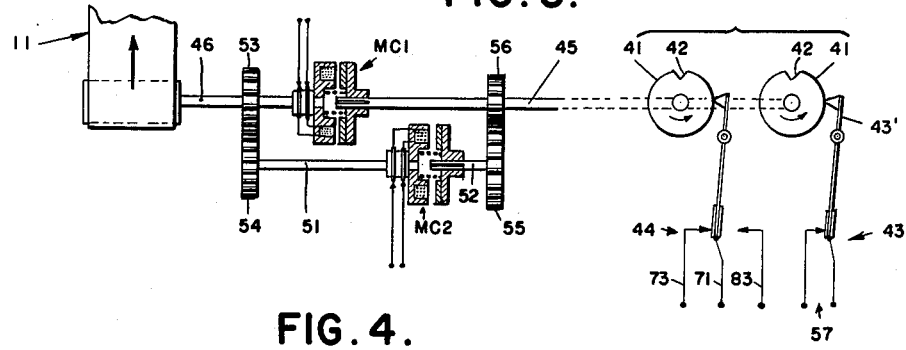
Fig. 3 is a diagrammatic representation of a part of the centering means.
Figure 4:
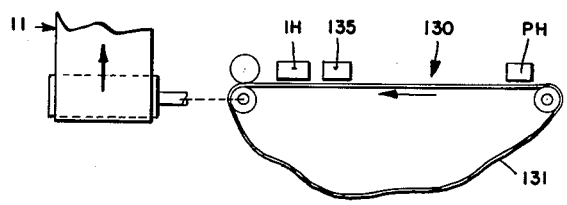
Fig. 4 is a diagrammatic view of a part of one of the station control means.

Considering first the centering means, the purpose of which is to determine when a package reaches a position as it moves along the conveyor such that the center of the package, irrespective of the length of the package, is opposite a centering point on the conveyor, I provide an electric eye means 32, the beam of which is cut by an article being carried on the main conveyor, together with means actuated by the cutting and restoration of the beam for, in a sense, measuring the length of the article. I provide a timing means which includes a cam 41 (Fig. 3, diagrammatically shown in two parts) driven at an initial speed per revolution which is less than the time it takes for the longest article to be handled to pass the beam. In other words, the cam is initially driven at a speed such that the cam does not make a complete revolution during the time period required for an article to pass through the beam. The cam begins its rotation when an article first cuts the beam and the speed of the cam is doubled when the beam is restored or completed by the article passing therethrough and the cam then travels at double the initial speed until the one revolution thereof has been completed. An alternate method is to have the cam reverse its direction of initial rotation and return to its original position at double speed.

The cam is shown as a cylindrical member having an axially extending depression or recess 42. Two cam follower switches 43 and 44 are provided. The cam is mounted on a shaft 45 which can be directly driven by a drive shaft 46 through a magnetic clutch MC1. The drive shaft is driven by the conveyor at desired speed. For the purpose of driving the drum at double the speed of the drive shaft, I provide a second magnetic clutch, MC2, for connecting two countershafts 51 and 52. Gears 53 and 54 connect the drive shaft and countershaft 51 and gears 55 and 56 connect the cam shaft 45 and countershaft 52, the gears being suitably proportioned to give a 2:1 ratio. Thus, when clutch MC1 is engaged and the other clutch disengaged, the cam is driven at one speed, while with clutch MC1 disengaged and clutch MC2 engaged, the cam is driven at twice the first speed.

The theory of the centering means will be apparent from the following example:

Assume conveyor speed of 48 f.p.m.
Let $$S = \text{conveyor speed} = \frac{48 \times 12}{60} = 9.6''/\text{sec.}$$

Let L=length of article=40"
Let initial speed of timer (when coupled to 1:1 ratio gears)=8 r.p.m. or one revolution in 7.5 seconds
Let final speed of timer (when coupled to 2:1 ratio gears) =16 r.p.m. or one revolution in 3.75 seconds.

Then as an article cuts and passes through the photoelectric beam, magnetic clutch MC1 is energized, coupling shafts 45 and 46, turning the cam 41 at 8 r.p.m. for a period of time equivalent to the length of the article, or $$\frac{L}{S} = \frac{40}{9.6} = 4.166 \text{ seconds}$$

At the instant the beam is restored, magnetic clutch MC1 releases and magnetic clutch MC2 engages so that the cam continues at double speed, or $$\frac{7.5 - \frac{L}{S}}{2} = 3.75 - \frac{L}{2S} \text{ seconds}$$

to complete one revolution.

The total time for one revolution =

$$\frac{L}{S} + 3.75 - \frac{L}{2S} \text{ seconds}$$

During this time the article moves $$\left(\frac{L}{S} + 3.75 - \frac{L}{2S}\right) \times S'', \text{ or } L + 3.75S - \frac{L}{2}$$

As I wish to work from the center of the article, then
The distance from the photoelectric beam to the center $$\text{of the article} = \left(L + 3.75S - \frac{L}{2}\right) - \frac{L}{2} \text{ or } = 3.75S$$

As $S=9.6''$, then $3.75S=36''$.

In place of a 40" article, any other length, less than 7.5S, may be substituted and the same distance of 3.75S holds, as the distance from the photoelectric beam to the centering point.

At the instant the centering means cam 41 completes its revolution, the centering means actuates or imparts a signal to the preselected station control means. Referring now to Fig. 2, in the interests of brevity and clarity I will describe the various electrical components and the functioning thereof concurrently. The photoelectric eye means may include conventional relay means (not shown) to operate a single-pole, double-throw switch 56 in a magnetic clutch circuit 57, the clutches MC1 and MC2 being connected to the terminals 59 and 58, respectively, of the switch. In series with the source of current and magnetic clutch MC2 is the cam-operated switch 43, the switch being open only when the cam follower part 43' of the switch is in recess 42 of the cam.

In a typical operation, assuming the operator closes pushbutton switch PB1 at the control panel to select Station A, this energizes the coil of a relay R1 through conductors 62, 63, 64, 65, 66 and the closed switch 67 of a relay RA. Relay R1 is held through conductors 68 and 69 and switch 70 thereof. When the article cuts the photoelectric beam, this causes the switch pole of switch 56 to close the circuit through magnetic clutch MC1, starting the cam to rotate at the initial speed. Movement of the cam closes switch 43 and shifts switch 44 to its other terminal. Closing of switch 43 sets up a circuit for magnetic clutch MC2, but the circuit is still open at switch 56. The shifting of switch 44 energizes the coil of relay coil RC through conductors 71, 73, 74, and 75. Relay RC has its own holding circuit through conductors 76, 77, 72, and 74 and closed switches 78 and 79. Energization of relay RC also closes switch 80, but the circuit including the switch is open at switch 44.

When the article completely passes the beam of the electric eye, switch 56 returns to its original position and magnetic clutch MC1 is deenergized (becoming disengaged) while magnetic clutch MC2 is energized (engaged) thereby causing the cam 41 to turn at double its initial speed. When the cam completes its revolution, switches 43 and 44 return to their original positions, the opening of switch 43 opening the circuit through magnetic clutch MC2. The shifting of the pole of switch 44 energizes a relay RA through condutcors 71, 83, switch 80, and conductors 84, 85 and 86. Relay RA has a time-delay switch 67 and an instantaneous switch 88. The latter, in closing, energizes relay RB through conductors 89, 90, 91, switch 92, and conductor 93. Switch 79, when RB is energized, connects conductors 95 and 96 before it breaks between conductors 72 and 77, thereby holding the coil of RA energized before breaking the make circuit of RA and breaking the holding circuit of RC.

When switch 44 returned to its original position, it also completed a circuit through the coil of a relay RP1 through conductors 71, 83, 84, 98, and 99 switch 100 having been closed by the energization of relay R1 by the initial closing of manual selector switch PB1. RP1 is held through conductor 102, limit switch LS1, conductor 103, closed switch 104, and conductor 105.

Relay RP1 closes the circuit containing the coil of solenoid valve SVA through conductors 107, 108, and 109 and the switch 110. Actuation of the solenoid valve causes the transfer means 16A to operate the head 20 thereof, moving across the main conveyor to push off the article in its path onto the branch conveyor 14A. The head engages a limit switch LS1 opening this. In the meantime, relay RA, switch 67 has completed its time cycle, opening switch 67 and thereby dropping the coil of relay R1 which in turn breaks the circuit to the coil of RP1, although the coil thereof is still held until the limit switch LS1 is opened. Energization of relay RA also completes a circuit through relay RT by means of conductors 111, 112, 113 and 93, thereby opening switch 92, and this drops relay RB. The return of RB to normal opens the circuit between conductors 95 and 96, deenergizing relay RA. Thus every component is returned to original position except relay RP1 which remains energized until the limit switch LS1 is opened by the transfer means. The opening of LS1 drops relay RP1, solenoid valve SVA is deenergized and the valve returns to normal or original position by means of conventional spring means embodied within it, thereby causing transfer means 16A to move back to its original position.

As previously indicated, when Station B (or a succeeding existent station) is selected, the centering means operates in the same manner as described, and, when the article reaches the centering point, a signal actuates the preselected Station B control means 34. The latter includes a recording and pickup unit 130 which may be of the magnetic tape type, having a tape 131 driven by the conveyor belt. The unit includes a recording or impulse head IH, a signal pickup head means PH actuated by a signal on the tape, and a signal erasing means 135, the tape traveling in the direction of the arrow. The length of the tape between the recording means and the pickup means is proportionate to the length of the conveyor belt from the centering point to Station B. For example, if the tape is driven at half the speed of the conveyor, the ratio of tape length to conveyor length is 1:2. Thus, when the tape portion bearing the signal has traveled to the pickup means, the article has traveled from the centering point to Station B.

Referring again to the wiring diagram, Fig. 2, to select Station B, the operator closes station selector switch PB2 energizing relay R2 through conductors 141, 142, 143, 65, switch 67 and conductor 66. Relay R2 is held through switch 145 and conductors 146, 147, and 148. When the article interrupts the beam of the photoelectric eye means, the centering means operates as before described, energizing relay RC, relay RA, relay RB, and deenergizing RC. RB, which is now energized, has a switch 150, the closing of which completes a circuit through the recording means or impulse head IH through conductors 151, 152, 154, 153, and 155 and closed switch 156 of relay R2. This imparts a signal to the tape 131, the length of the signal, time-wise, being governed by relay RA, as the signal is cut off when RA is deenergized as this deenergizes relay RT, in turn dropping relay RB. Relay R2 is dropped in a manner similar to that described above for relay R1.

When the magnetized portion of the tape reaches the pickup means PH, the signal is picked up, amplified electronically in any suitable manner and used to energize a relay RP2 by energizing a relay RX through conductors 160, 161, and 162. The relay RX closes switch 165, energizing the coil of relay RP2 through conductors 166, 167, and 168. The relay is held through its switch 170 and conductors 171, 172, and 173 and normally closed limit switch LS2. The energization of relay RP2 closes switch 175 in series with the solenoid valve SVB, the circuit including conductors 176, 177, 178, and 179. This circuit is opened when the limit switch LS2 is opened by the transfer means reaching the end of its stroke, thereby dropping relay RP2 and restoring the circuits to normal.

In the above description and in the drawing I have disclosed the centering means and the tape recorder units as being directly driven by the conveyor. This of course is not essential, since all that is required is that these elements be driven in synchronism with the conveyor. Thus selsyn motors might be used in a conventional manner in place of a direct drive. Also, it should be apparent that, since the centering means and the tape recorder units are driven at a given speed ratio to the speed of the conveyor, the latter need not be constant and the conveyor may even be stopped and started without affecting the accuracy of the apparatus.

Although I have illustrated and described a preferred form of my invention, I contemplate that various changes and modifications can be made without departing from the invention, the scope of which is indicated by the following claims. By way of example, where it is not necessary to operate transfer devices, or other devices at the instant an article is centered opposite the device, I may eliminate the centering means and merely use an article-detecting means to signal or actuate a preselected device control means when an article is detected by the detecting means.

I claim:

1. In apparatus of the type described, a conveyor for moving articles, means for driving the conveyor, article-detecting means at a given point along said conveyor for signaling the passage thereby of the front and rear of an article on the conveyor, a timing mechanism operatively associated with and actuated by said article-detecting means for determining when the article reaches a position such that the center of the article, as measured from front to rear, is at a centering point along the conveyor a predetermined distance beyond said article-detecting means, and means for performing a given operation when the article reaches and is centered at a given station point along the conveyor, said last-mentioned means being operable in response to actuation by said timing mechanism.

2. In apparatus of the type described including a conveyor for moving articles, means for driving the conveyor, and article-detecting means at a given point along the conveyor for signaling the passage thereby of the front and rear of an article on the conveyor, a timing mechanism for determining when an article reaches a position such that the center of the article, as measured from front to rear, is at a given distance beyond said given point, comprising a rotatable member, means for initially driving said member at a given speed relative to the speed of the conveyor during the time an article is passing a given point, said given speed being such that said member rotates less than one revolution during the passage of the article past said given point, means for returning said member to its original position at a speed twice said given speed, said article-detecting means being operable to actuate the means for initially driving said member at said given speed and being operable to actuate said return means for said member, and means operable by said member to signal the return of said member to its original position.

3. Apparatus as set forth in claim 2 in which said rotatable member always rotates in the same direction.

4. Apparatus as set forth in claim 2 in which said rotatable member rotates in a given direction during the initial driving thereof and in which said rotatable member rotates in the direction opposite to said given direction when returning to its original position.

5. In apparatus of the type described including a conveyor for moving articles, means for moving the conveyor, and article-detecting means at a given point along the conveyor for signaling the passage thereby of the front and rear of an article on the conveyor, a timing mechanism for determining when an article reaches a position such that the center of the article, as measured from front to rear, is at a given distance beyond said given point, comprising a movable element, means limiting travel of said element to a maximum given amount, means actuated by said article-detecting means when an article is initially detected thereby for initially driving said element at a given speed relative to the speed of the conveyor, means actuated by said article-detecting means as the rear of the article passes thereby for driving said element at a speed twice said given speed for the remainder of the travel permitted said element, and means operable by said element at the completion of its travel for signaling said completion.

6. In apparatus of the type described, a conveyor for transporting articles, means for driving the conveyor, article-detecting means at a given point along the conveyor, a timing mechanism actuated by said article-detecting means for determining when an article reaches a position such that the center of the article from front to rear is at a centering point along the conveyor a predetermined distance beyond said given point, an operation-performing device located a given distance beyond said centering point, an endless member driven at a given speed relative to said conveyor, signal-imparting means associated with said endless member, signal-pickup means associated with said endless member at a distance therealong from said signal-imparting means equivalent relatively to the distance along said conveyor of said device from said centering point, said timing mechanism being effective to actuate said signal-imparting means at the instant an article reaches said centering point, and means operatively associated with and actuated by said signal-pickup means for actuating said device.

7. In apparatus as described including a conveyor, means driving the conveyor, and a plurality of operation-performing devices spaced along said conveyor, means for actuating a selected device when an article on the conveyor reaches the device, comprising article-detecting means at a point along the conveyor ahead of said devices including photoelectric eye means providing a beam of light adapted to be interrupted by an article traveling on the conveyor, an endless magnetically sensitive member for each device driven at a given speed with relation to the conveyor, a normally inactivated signal-imparting means and a normally inactivated signal-pickup means associated with each endless member, said signal-imparting means and said signal-pickup means for each endless member being spaced along said endless member a distance equivalent relatively to the distance the said device with which said endless member is associated is spaced along the conveyor from the point of said article-detecting means, means for selectively activating each of said signal-imparting and -pickup means, means operable by said article-detecting means for actuating the activated signal-imparting means, and means operable by each of said signal-pickup means to actuate the device with which the signal-pickup means is associated.

8. The apparatus set forth in claim 7 in which means is provided for preventing activation of a second signal-imparting means and -pickup means until after the activated signal-imparting means has completed its function.

9. In apparatus including a conveyor, means driving the conveyor, and a plurality of operation-performing devices spaced along said conveyor, means for actuating a selected device when an article on the conveyor reaches the device, comprising article-detecting means at a given point along the conveyor ahead of said devices, a timing mechanism actuated by said article-detecting means for determining when an article reaches a position such that the center of the article from front to rear in the direction of its travel is at a centering point along the conveyor a predetermined distance beyond said given point, the nearest of said devices to said given point being located at said centering point, a control mechanism for each of said devices, said mechanisms being normally inactivated, means for manually activating said control mechanisms, means connecting said timing mechanism to each of said control mechanisms, said timing mechanism being effective to actuate an activated control mechanism when an article reaches said centering point, the control mechanism for said nearest device, when actuated, being effective to immediately actuate said device, the control mechanism of other devices being effective to actuate their respective devices after a time delay equivalent to the time required for an article to travel on the conveyor from said centering point to the devices, respectively.

10. In apparatus including a conveyor, means driving the conveyor, and a plurality of operation-performing devices spaced along said conveyor, means for actuating a selected device when an article on the conveyor reaches the device, comprising article-detecting means at a given point along the conveyor ahead of said devices, a timing mechanism actuated by said article-detecting means for determining when an article reaches a position such that the center of the article from front to rear in the direction of its travel is at a centering point along the conveyor a predetermined distance beyond said given point, a control mechanism for each of said devices, said mechanisms being normally inactivated, means for manually selectively activating said control mechanisms, means connecting said timing mechanism to each of said control mechanisms, said timing mechanism being effective to actuate an activated control mechanism when an article reaches said centering point, the control mechanism of said devices being effective to actuate their respective devices after a time delay equivalent to the time required for an article to travel on the conveyor from said centering point to the devices, respectively.

11. In apparatus including a driven conveyor and a synchronously driven signal carrier means, a plurality of operation-performing devices spaced along the conveyor and an actuating means for each device including a signal pickup element associated with the signal carrier means at a point therealong corresponding to the location of its corresponding device along the conveyor, control means for automatically imparting a selected signal to the signal carrier means in response to the presence of an article at a given region along the conveyor, comprising a plurality of normally open signal circuits each including a signal-imparting head associated with the signal carrier means, relay means controlling each signal circuit, a manually operable selector switch for each relay means, article-detecting means for detecting the presence of an article on the conveyor, timing means actuated by said article-detecting means, said selector switches being connected to activate the respective relay means whereby to in turn activate a selected signal circuit, said timing means being connected to complete the operation of a selected relay means whereby to cause completion of a selected and activated signal circuit.

12. Apparatus as set forth in claim 11 in which means is provided for preventing the functioning of a second relay means after the activation of a relay means by a selector switch until after the signal circuit controlled by the activated relay means has completed its function.

References Cited in the file of this patent

UNITED STATES PATENTS

| | | |
|---|---|---|
| 1,868,894 | Glahn | July 26, 1932 |
| 1,880,374 | Dahlstrom | Oct. 4, 1932 |
| 2,217,342 | Ladrach | Oct. 8, 1940 |
| 2,497,149 | Berdis et al. | Feb. 14, 1950 |
| 2,497,874 | Evans et al. | Feb. 21, 1950 |
| 2,587,686 | Berry | Mar. 4, 1952 |
| 2,636,622 | Saxe | Apr. 28, 1953 |
| 2,784,851 | Bretschneider | Mar. 12, 1957 |